US006418600B1

(12) United States Patent
Benoit

(10) Patent No.: US 6,418,600 B1
(45) Date of Patent: Jul. 16, 2002

(54) UNIVERSAL BEARING PULLER AND INSTALLER

(76) Inventor: Yvon J. Benoit, 151 Mitchell Rd RR2, Kapuskasing (CA), P5N 2X8

( * ) Notice: Subject to any disclaimer, the term of this patent is extended or adjusted under 35 U.S.C. 154(b) by 0 days.

(21) Appl. No.: 09/928,082

(22) Filed: Aug. 10, 2001

(51) Int. Cl.[7] .................................................. B23P 19/04

(52) U.S. Cl. ......................... 29/263; 29/427; 29/898.08; 29/256; 29/258; 29/257

(58) Field of Search .......................... 29/256, 257, 258, 29/259, 260, 263, 266, 898.01, 898.07, 898.08, 264, 282; 408/82, 93

(56) References Cited

U.S. PATENT DOCUMENTS 3,727,293 A * 4/1973 Phillips ........................ 29/427
3,763,539 A * 10/1973 Dodd ........................... 29/201
3,886,644 A 6/1975 Koch, Jr.
3,887,989 A * 6/1975 Maynard ...................... 29/427
4,509,241 A 4/1985 Freeland et al.
4,624,041 A * 11/1986 Gathright et al. ............. 29/263
4,761,868 A 8/1988 Allison
4,875,266 A * 10/1989 Batten ......................... 29/263
5,165,169 A 11/1992 Boyce
5,213,455 A 5/1993 Reynolds
5,228,180 A * 7/1993 Bauer .......................... 29/263
D355,823 S 2/1995 Dumas et al.
5,894,665 A * 4/1999 Olmstead ................. 29/898.08

* cited by examiner

*Primary Examiner*—Joseph J. Hail, III
*Assistant Examiner*—Daniel Shanley

(57) ABSTRACT

A universal bearing puller and installer for removing and installing bearings. The inventive device includes an extractor tool. The extractor tool is comprised of a cylindrical housing. The cylindrical housing is split longitudinally into a pair of sections. The tabs of the pair of sections have corresponding coupling means to facilitate securement of the sections together thereby forming the cylindrical housing. An open upper end of the cylindrical housing has a plate disposed therein. The plate has a threaded aperture disposed centrally therethrough. The threaded aperture receives a screw therein. A first adapter is dimensioned for being received within an open lower end of the cylindrical housing. The first adapter is adapted for tapered roller bearings. A second adapter is dimensioned for being received within an open lower end of the cylindrical housing. The second adapter is adapted for ball bearings.

18 Claims, 5 Drawing Sheets

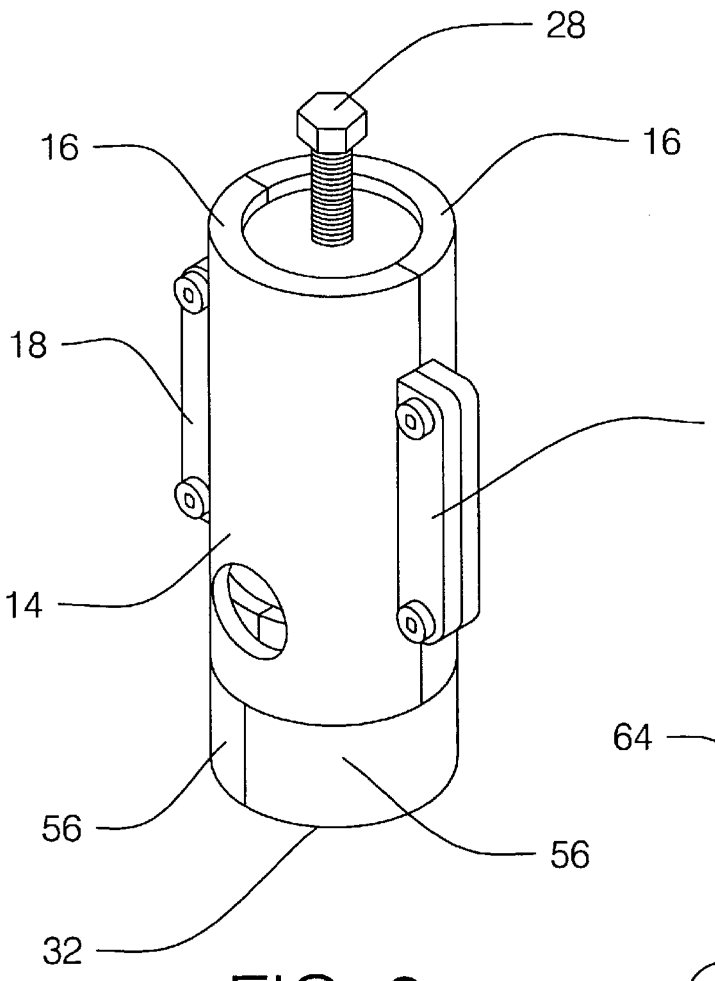
FIG. 2
FIG. 3
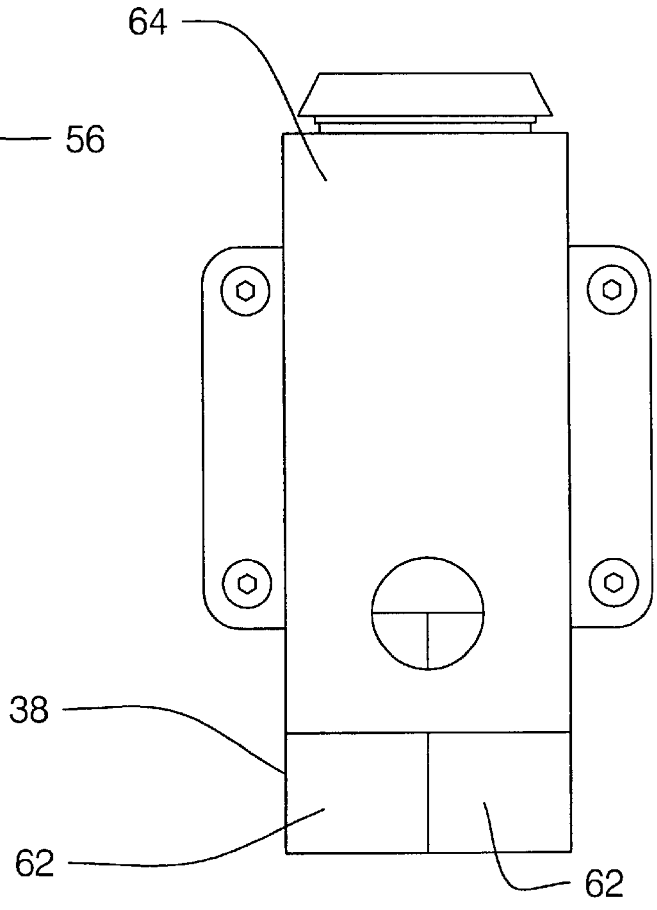

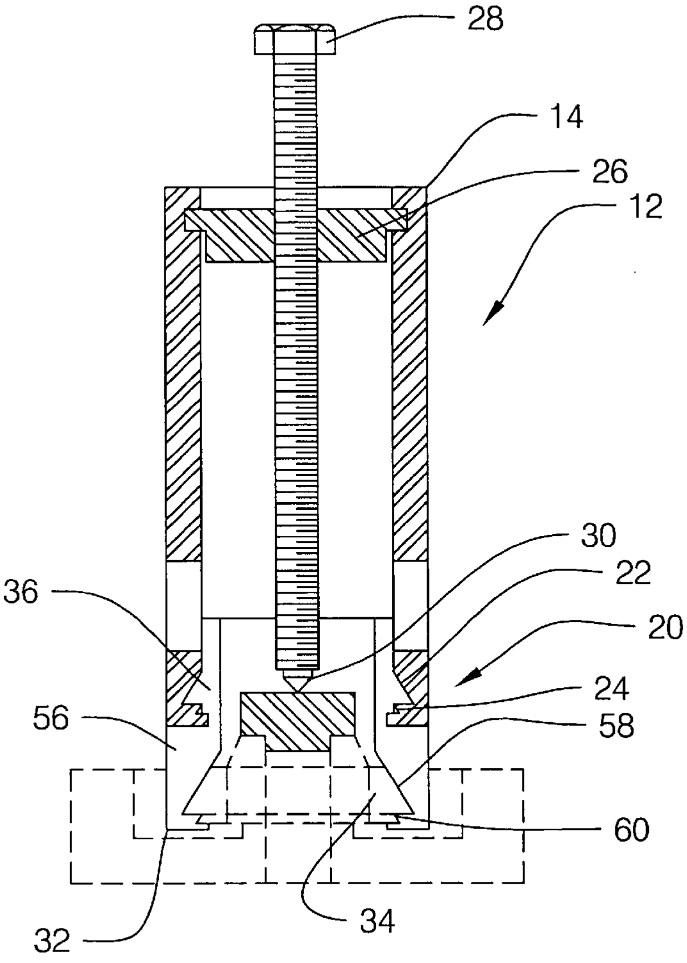
FIG. 4
FIG. 5
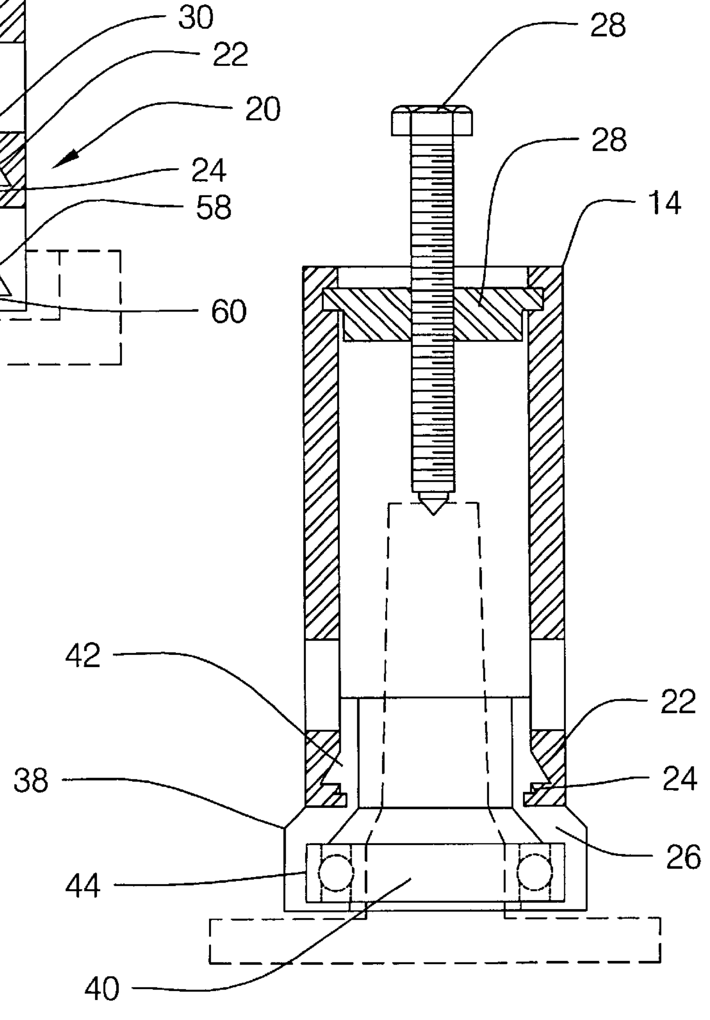

UNIVERSAL BEARING PULLER AND INSTALLER

BACKGROUND OF THE INVENTION

1. Field of the Invention

The present invention relates to bearing tools and more particularly pertains to a new universal bearing puller and installer for removing and installing bearings.

2. Description of the Prior Art

The use of bearing tools is known in the prior art. More specifically, bearing tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art bearing tools include U. S. Pat. No. 5,213,455 to Reynolds; U.S. Pat. No. 4,761,868 to Allison; U.S. Pat. No. Des. 355,823 to Dumas et al.; U.S. Pat. No. 4,509,241 to Freeland et al.; U.S. Pat. No. 3,886,644 to Koch, Jr.; and U.S. Pat. No. 5,165,169 to Boyce.

While these devices fulfill their respective, particular objectives and requirements, the aforementioned patents do not disclose a new universal bearing puller and installer. The inventive device includes an extractor tool adapted for removing bearings. The extractor tool is comprised of a cylindrical housing. The cylindrical housing is split longitudinally into a pair of sections. The pair of sections each have a pair of tabs extending outwardly therefrom. The tabs of the pair of sections have corresponding coupling means to facilitate securement of the sections together thereby forming the cylindrical housing. An open upper end of the cylindrical housing has a plate disposed therein. The plate has a threaded aperture disposed centrally therethrough. The threaded aperture receives a screw therein. The screw has a pointed tip. A first adapter is dimensioned for being received within an open lower end of the cylindrical housing. The first adapter is adapted for tapered roller bearings. A second adapter is dimensioned for being received within an open lower end of the cylindrical housing. The second adapter is adapted for tapered roller bearings.

In these respects, the universal bearing puller and installer according to the present invention substantially departs from the conventional concepts and designs of the prior art, and in so doing provides an apparatus primarily developed for the purpose of removing and installing bearings.

SUMMARY OF THE INVENTION

In view of the foregoing disadvantages inherent in the known types of bearing tools now present in the prior art, the present invention provides a new universal bearing puller and installer construction wherein the same can be utilized for removing and installing bearings.

The general purpose of the present invention, which will be described subsequently in greater detail, is to provide a new universal bearing puller and installer apparatus and method which has many of the advantages of the bearing tools mentioned heretofore and many novel features that result in a new universal bearing puller and installer which is not anticipated, rendered obvious, suggested, or even implied by any of the prior art bearing tools, either alone or in any combination thereof.

To attain this, the present invention generally comprises an extractor tool adapted for removing bearings. The extractor tool is comprised of a cylindrical housing. The cylindrical housing is split longitudinally into a pair of sections. The pair of sections each have a pair of tabs extending outwardly therefrom. The tabs of the pair of sections have corresponding coupling means to facilitate securement of the sections together thereby forming the cylindrical housing. A lower interior edge of the cylindrical housing includes a double tapered surface comprised of an inversely tapered section and an inversely tapered extension disposed below the inversely tapered section. An open upper end of the cylindrical housing has a plate disposed therein. The plate has a threaded aperture disposed centrally therethrough. The threaded aperture receives a screw therein. The screw has a pointed tip. A first adapter is dimensioned for being received within an open lower end of the cylindrical housing. The first adapter is adapted for tapered roller bearings. An upper end of the first adapter has a double tapered profile for seating in the double tapered surface. A lower end of the first adapter is dimensioned for receiving a tapered roller bearing therein. A second adapter is dimensioned for being received within an open lower end of the cylindrical housing. The second adapter is adapted for tapered roller bearings. An upper end of the second adapter has a double tapered profile for seating in the double tapered surface. A lower end of the second adapter has an annular recess therein dimensioned for receiving a ball bearing therein. An installation tool is provided that includes a cylindrical sleeve having an open lower end and a closed upper end. The closed upper end has a threaded hole centrally therethrough. The threaded hole has a knurled handle secured thereto. The open lower end is dimensioned for receiving an installation insert. The installation insert has a lower end adapted for coupling with a bearing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new universal bearing puller and installer apparatus and method which has many of the advantages of the bearing tools mentioned heretofore and many novel features that result in a new universal bearing puller and installer which is not anticipated, rendered obvious, suggested, or even implied by any of the prior art bearing tools, either alone or in any combination thereof.

It is another object of the present invention to provide a new universal bearing puller and installer which may be easily and efficiently manufactured and marketed.

It is a further object of the present invention to provide a new universal bearing puller and installer which is of a durable and reliable construction.

An even further object of the present invention is to provide a new universal bearing puller and installer which is susceptible of a low cost of manufacture with regard to both materials and labor, and which accordingly is then susceptible of low prices of sale to the consuming public, thereby making such universal bearing puller and installer economically available to the buying public.

Still yet another object of the present invention is to provide a new universal bearing puller and installer which provides in the apparatuses and methods of the prior art some of the advantages thereof, while simultaneously overcoming some of the disadvantages normally associated therewith.

Still another object of the present invention is to provide a new universal bearing puller and installer for removing and installing bearings.

Yet another object of the present invention is to provide a new universal bearing puller and installer which includes an extractor tool adapted for removing bearings. The extractor tool is comprised of a cylindrical housing. The cylindrical housing is split longitudinally into a pair of sections. The pair of sections each have a pair of tabs extending outwardly therefrom. The tabs of the pair of sections have corresponding coupling means to facilitate securement of the sections together thereby forming the cylindrical housing. An open upper end of the cylindrical housing has a plate disposed therein. The plate has a threaded aperture disposed centrally therethrough. The threaded aperture receives a screw therein. The screw has a pointed tip. A first adapter is dimensioned for being received within an open lower end of the cylindrical housing. The first adapter is adapted for tapered roller bearings. A second adapter is dimensioned for being received within an open lower end of the cylindrical housing. The second adapter is adapted for tapered roller bearings.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a perspective view of the extractor portion of the present invention.

FIG. 3 is a side elevation view of the extractor portion of the present invention.

FIG. 4 is a cross-sectional view of the extractor portion of the present invention.

FIG. 5 is a cross-sectional view of the extractor portion of the present invention as adapted for use in ball bearing removal.

DESCRIPTION OF THE PREFERRED EMBODIMENT

Figure 1:
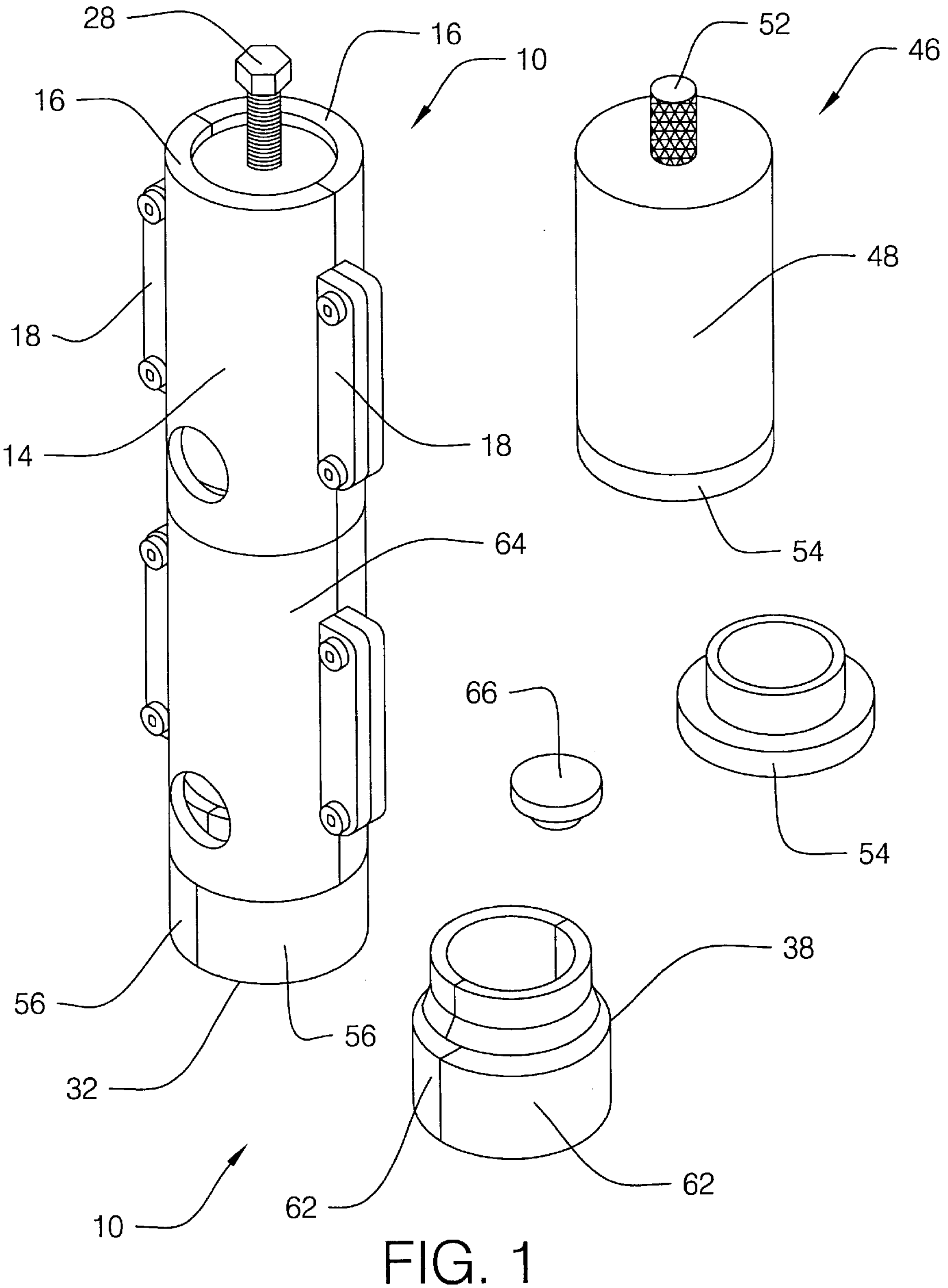
FIG. 1 is a perspective view of a new universal bearing puller and installer system according to the present invention.
Figure 6:
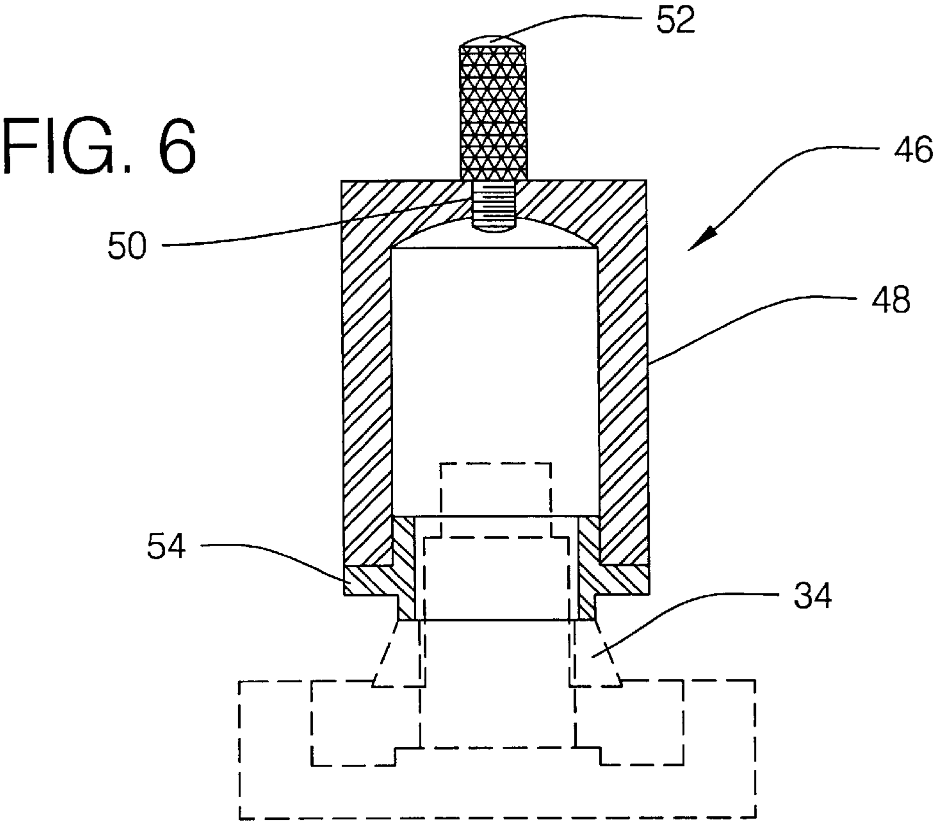
FIG. 6 is a cross-sectional view of the installer of the present invention as adapted for use on tapered roller bearings.
Figure 7:
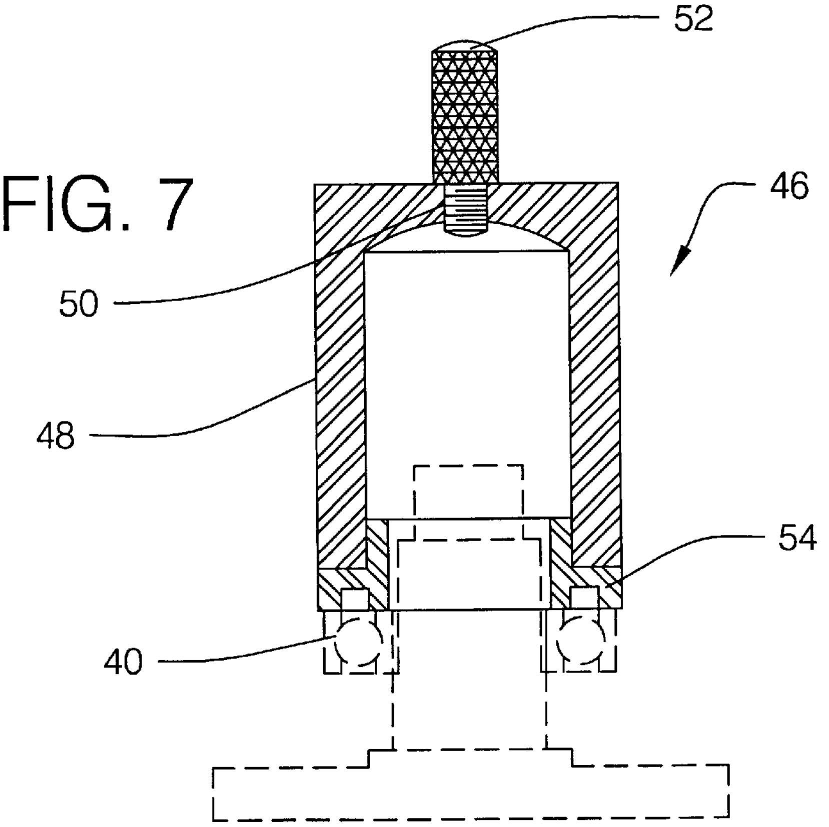
FIG. 7 is a cross-sectional view of the installer of the present invention as adapted for use on ball bearings.
Figure 8:
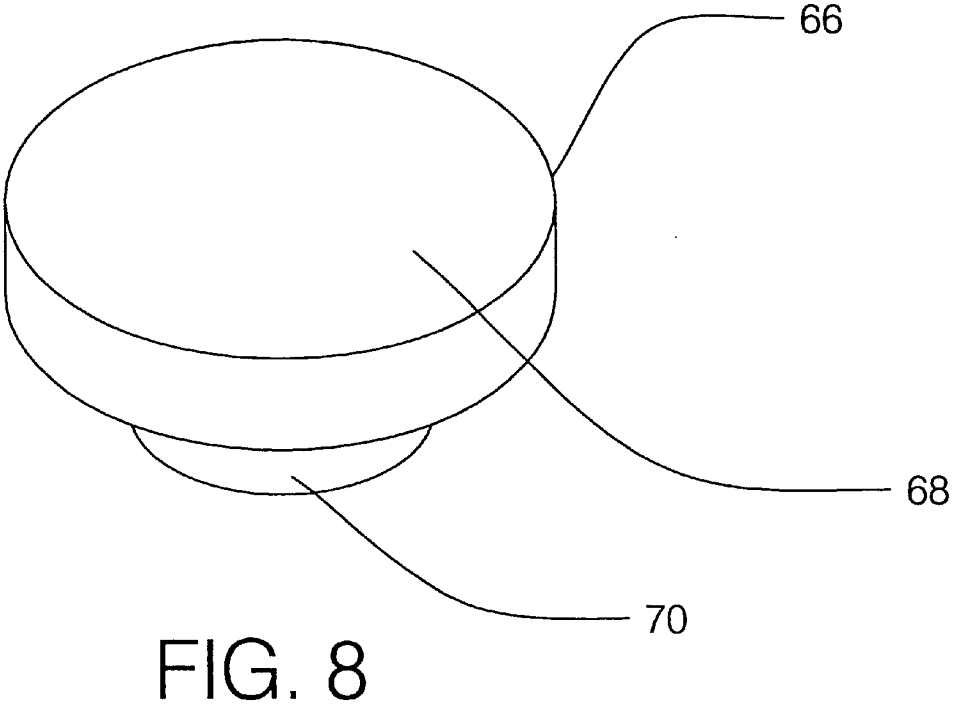
FIG. 8 is a perspective view of the end cap of the present invention.
Figure 9:
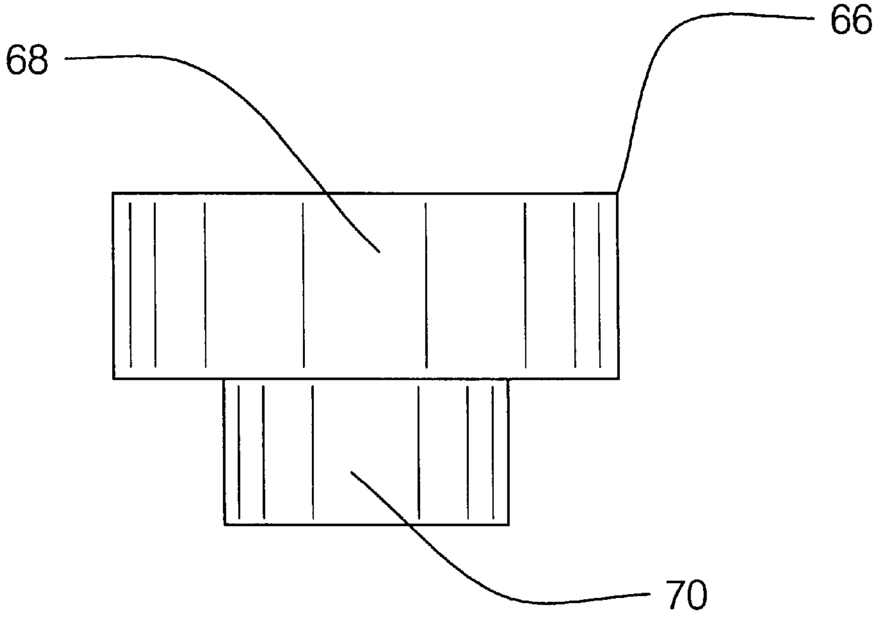
FIG. 9 is a side elevational view of the end cap of the present invention.

With reference now to the drawings, and in particular to FIGS. 1 through 9 thereof, a new universal bearing puller and installer embodying the principles and concepts of the present invention and generally designated by the reference numeral 10 will be described.

As best illustrated in FIGS. 1 through 9, the universal bearing puller and installer 10 comprises an extractor tool 12 adapted for removing bearings. The extractor tool 12 is comprised of a cylindrical housing 14. The cylindrical housing 14 is split longitudinally into a pair of sections 16. The pair of sections 16 each have a pair of tabs 18 extending outwardly therefrom. The tabs 18 of the pair of sections have corresponding coupling means to facilitate securement of the sections together thereby forming the cylindrical housing 12. The coupling means includes a pair of threaded holes in the tabs 18 of each section 16 while the tabs 18 on the opposed section has non-threaded holes. The holes permit the two sections 16 to be secured together by bolts. A lower interior edge of the cylindrical housing includes a double tapered surface 20 comprised of an inversely tapered section 22 and an inversely tapered extension 24 disposed below the inversely tapered section 22. An open upper end of the cylindrical housing 14 has a plate 26 disposed therein. The plate 26 has a threaded aperture disposed centrally therethrough. The threaded aperture receives a screw 28 therein. The screw 28 has a pointed tip 30. The double tapered surface 20 acts as a pulling surface for cone-shape bearings and as a holder for holding a variety of adapters described hereafter. Further, an end cap 66 having a base portion 68 and an alignment portion 70. The alignment portion 70 of the end cap 66 is designed for being positioned within a lumen of a hollow shaft and the base portion 68 rests on the upper end of the hollow shaft. The pointed tip 30 is contacts the base portion 68 of the end cap 66 thus providing a solid contact surface for the pointed tip 30 to press on when working with the hollow shaft.

A first adapter 32 is dimensioned for being received within an open lower end of the cylindrical housing 14. The first adapter 32 is adapted for tapered roller bearings 34. An upper end of the first adapter 32 has a double tapered profile 36 for seating in the double tapered surface 20 of the cylindrical housing 14. A lower end of the first adapter 22 is dimensioned for receiving a tapered roller bearing 34 therein. The first adapter 32 is designed for removing the tapered roller bearing 34 when the first adapter 32 is coupled to the cylindrical housing 14.

The first adapter 32 is split in a plane passing through a central axis into two portions 56. The two portions 56 of the first adapter 32 is seperable for situating about a bearing and being securable together about the bearing when the two portions 56 of the first adapter 32 are received in the lower end of the housing 14. The lower end of the first adapter 32 having a first angled face 58. The first angled face 58 is designed for abutting the roller of the tapered bearing 34 when first adapter 32 engages the tapered bearing 34. The lower end of the first adapter 32 has a second angled face 60 disposed below the first angled face 58. The second angled face 60 is designed for engaging an outer race of the tapered bearing 34 when the bearing is being pulled.

A second adapter 38 is dimensioned for being received within an open lower end of the cylindrical housing 14. The second adapter 38 is adapted for ball bearings 40. An upper end of the second adapter 38 has a double tapered profile 42 for seating in the double tapered surface 20 of the cylindrical housing 14. A lower end of the second adapter 38 has an annular recess 44 therein dimensioned for receiving a ball bearing 40 therein. The second adapter 38 is split in a plane passing through a central axis into two portions 62. The two portions 62 of the second adapter 38 are separable for situating about a bearing and are securable together about the bearing when the two portions 62 of the second adapter 38 are received in the lower end of the housing 14.

An extension member 64 is for being coupled between the lower end of the cylindrical housing 14 and the first adapter 32 and second adapter 38, depending on which adapter is to be used. The extension member 64 being for extending the length of the cylindrical housing 14 for reaching deeply seated bearings.

An installation tool 46 is provided that includes a cylindrical sleeve 48 having an open lower end and a closed upper end. The closed upper end has a threaded hole 50 centrally therethrough. The threaded hole 50 has a knurled handle 52 secured thereto. The open lower end is dimensioned for receiving an installation insert 54. The installation insert 54 has a lower end adapted for coupling with a bearing.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new universal bearing puller and installer system for removing and installing bearings comprising, in combination:

an extractor tool adapted for removing bearings, the extractor tool comprising a housing, an open upper end of the cylindrical housing having a plate disposed therein, the plate having a threaded aperture disposed centrally therethrough, the threaded aperture receiving a screw therein, the screw having a pointed tip;

a first adapter dimensioned for being received within an open lower end of the housing, the first adapter being adapted for tapered roller bearings, the first adapter being adapted for removing a tapered roller bearing when the first adapter is coupled to the housing; and a second adapter dimensioned for being received within the open lower end of the cylindrical housing when the first adapter is removed from the housing, the second adapter being adapted for ball bearings, the second adapter being adapted for removing a ball bearing when the second adapter is coupled to the housing.

wherein a lower interior edge of the cylindrical housing includes a double tapered surface comprising an inversely tapered section and an inversely tapered extension disposed below the inversely tapered section.

2. The universal bearing puller and installer system as set forth in claim 1 and further including an installation tool including a sleeve, the sleeve having an open lower end and a closed upper end, the open lower end being dimensioned for receiving an installation insert, the installation insert having a lower end adapted for coupling with a bearing.

3. The universal bearing puller and installer system as set forth in claim 2 wherein the closed upper end has a threaded hole centrally therethrough, the threaded hole having a knurled handle secured thereto.

4. The universal bearing puller and installer system as set forth in claim 1 wherein an upper end of the first adapter has a double tapered profile for seating in the double tapered surface of the cylindrical housing, a lower end of the first adapter being dimensioned for receiving a tapered roller bearing therein.

5. The universal bearing puller and installer system as set forth in claim 5 wherein the lower end of the first adapter has a first angled face, the first angled face being adapted for abutting the roller of the tapered bearing when first adapter engages the tapered bearing, the lower end of the first adapter having a second angled face disposed below the first angled face, the second angled face being adapted for engaging an outer race of the tapered bearing when the bearing is being pulled.

6. The universal bearing puller and installer system as set forth in claim 1 wherein an upper end of the second adapter has a double tapered profile for seating in the double tapered surface of the cylindrical housing, a lower end of the second adapter having an annular recess therein dimensioned for receiving a ball bearing therein.

7. The universal bearing puller and installer system as set forth in claim 1 wherein the housing is split longitudinally into a pair of sections, the pair of sections each having a pair of tabs extending outwardly therefrom, the tabs of the pair of sections having corresponding coupling means to facilitate securement of the sections together thereby forming the housing.

8. The universal bearing puller and installer system as set forth in claim 1 wherein the first adapter is split in a plane passing through a central axis into two portions, the two portions of the first adapter being seperable for situating about a bearing and being securable together about the bearing when the two portions of the first adapter are received in the lower end of the housing.

9. The universal bearing puller and installer system as set forth in claim 1 wherein the second adapter is split in a plane passing through a central axis into two portions, the two portions of the second adapter being seperable for situating about a bearing and being securable together about the bearing when the two portions of the second adapter are received in the lower end of the housing.

10. A new universal bearing puller and installer system for removing and installing bearings comprising, in combination:

an extractor tool adapted for removing bearings, the extractor tool comprising a housing, an open upper end of the cylindrical housing having a plate disposed therein, the plate having a threaded aperture disposed centrally therethrough, the threaded aperture receiving a screw therein, the screw having a pointed tip;

a first adapter dimensioned for being received within an open lower end of the housing, the first adapter being adapted for tapered roller bearings, the first adapter being adapted for removing a tapered roller bearing when the first adapter is coupled to the housing; and a second adapter dimensioned for being received within the open lower end of the cylindrical housing when the first adapter is removed from the housing, the second adapter being adapted for ball bearings, the second adapter being adapted for removing a ball bearing when the second adapter is coupled to the housing;

wherein the housing is split longitudinally into a pair of sections, the pair of sections each having a pair of tabs extending outwardly therefrom, the tabs of the pair of sections having corresponding coupling means to facilitate securement of the sections together thereby forming the housing.

11. The universal bearing puller and installer system as set forth in claim 10 and further including an installation tool including a sleeve, the sleeve having an open lower end and a closed upper end, the open lower end being dimensioned for receiving an installation insert, the installation insert having a lower end adapted for coupling with a bearing.

12. The universal bearing puller and installer system as set forth in claim 10 wherein the closed upper end has a threaded hole centrally therethrough, the threaded hole having a knurled handle secured thereto.

13. The universal bearing puller and installer system as set forth in claim 10 wherein a lower interior edge of the cylindrical housing includes a double tapered surface comprised of an inversely tapered section and an inversely tapered extension disposed below the inversely tapered section.

14. The universal bearing puller and installer system as set forth in claim 13 wherein an upper end of the first adapter has a double tapered profile for seating in the double tapered surface of the cylindrical housing, a lower end of the first adapter being dimensioned for receiving a tapered roller bearing therein.

15. The universal bearing puller and installer system as set forth in claim 14 wherein the lower end of the first adapter has a first angled face, the first angled face being adapted for abutting the roller of the tapered bearing when first adapter engages the tapered bearing, the lower end of the first adapter having a second angled face disposed below the first angled face, the second angled face being adapted for engaging an outer race of the tapered bearing when the bearing is being pulled.

16. The universal bearing puller and installer system as set forth in claim 13 wherein an upper end of the second adapter has a double tapered profile for seating in the double tapered surface of the cylindrical housing, a lower end of the second adapter having an annular recess therein dimensioned for receiving a ball bearing therein.

17. The universal bearing puller and installer system as set forth in claim 1 wherein the first adapter is split in a plane passing through a central axis into two portions, the two portions of the first adapter being seperable for situating about a bearing and being securable together about the bearing when the two portions of the first adapter are received in the lower end of the housing.

18. The universal bearing puller and installer system as set forth in claim 10 wherein the second adapter is split in a plane passing through a central axis into two portions, the two portions of the second adapter being seperable for situating about a bearing and being securable together about the bearing when the two portions of the second adapter are received in the lower end of the housing.

* * * * *